United States Patent
Betulius et al.

[15] 3,643,745
[45] Feb. 22, 1972

[54] EARTHWORKING IMPLEMENT AND SUPPORT

[72] Inventors: Gilbert E. Betulius; Norman W. Pfeiffer, both of Mount Vernon, Ind.

[73] Assignee: Chem-Farm Inc., Evansville, Ind.

[22] Filed: June 25, 1969

[21] Appl. No.: 836,521

[52] U.S. Cl. ............................................. 172/413, 172/466
[51] Int. Cl. ........................................................ A01b 63/22
[58] Field of Search .......................................... 172/413, 466

[56] References Cited

UNITED STATES PATENTS

| | | | |
|---|---|---|---|
| 2,593,176 | 4/1952 | Patterson | 172/466 X |
| 2,985,247 | 5/1961 | Oehler et al. | 172/413 |
| 2,994,544 | 8/1961 | Wolf | 172/413 X |
| 3,190,366 | 6/1965 | Johnson et al. | 172/413 |
| 3,411,800 | 11/1968 | Krumholz | 172/413 UX |

*Primary Examiner*—Clyde I. Coughenour
*Attorney*—Olson, Trexler, Wolters & Bushnell

[57] ABSTRACT

An earthworking implement containing a plurality of earthworking tools attached to a rigid frame which is supported by at least four wheel assemblies. The wheel assemblies are spaced so as to provide stable support for the frame when one or more of the wheel assemblies are disengaged from their supporting surface. The wheel assemblies are journaled to supporting struts which are attached to a cylindrical wheel support rod. The wheel support rod is journaled to the frame, and means are provided to rotate the wheel support rod to raise and lower the frame with respect to the wheels.

6 Claims, 6 Drawing Figures

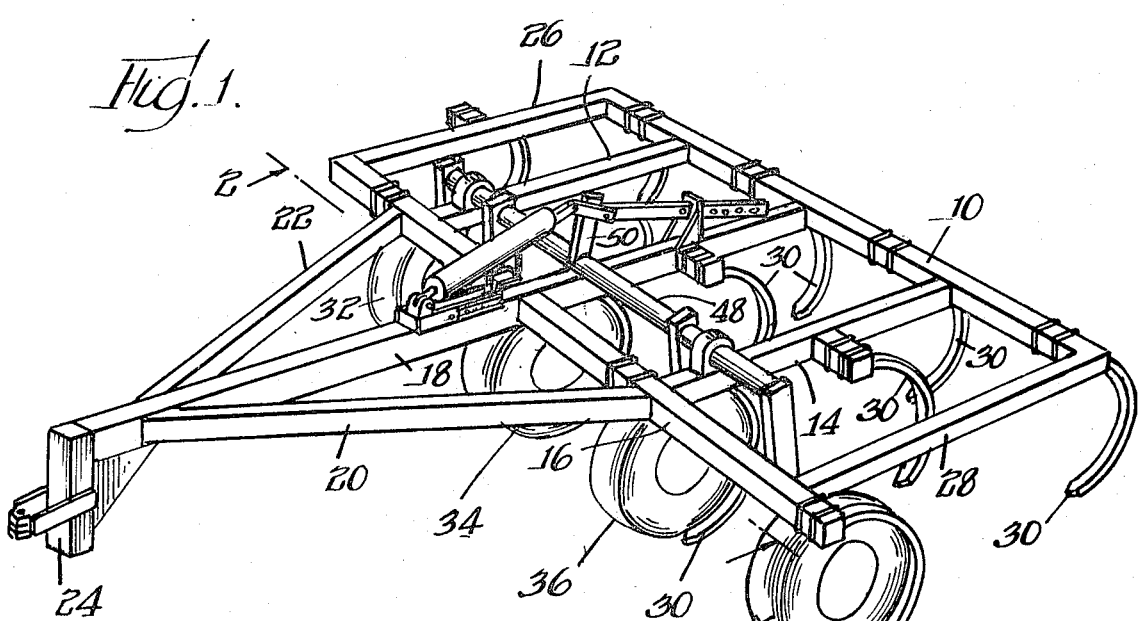
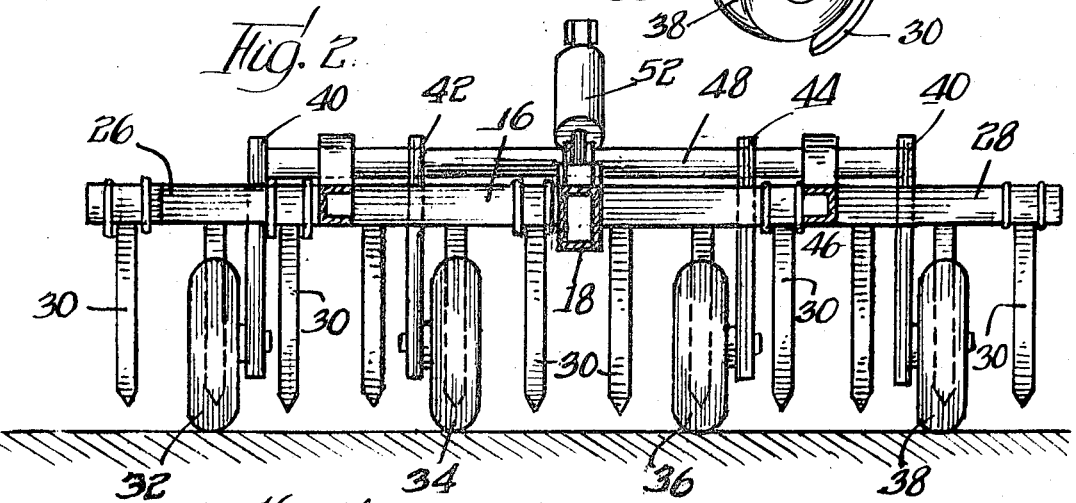
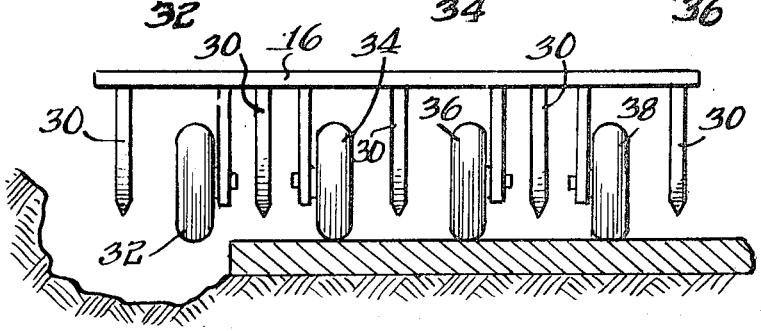
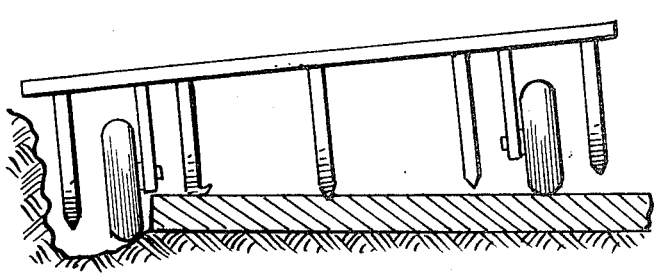
Inventors
Gilbert F. Betulius
Norman W. Pfeiffer
By: Olson, Trexler, Wolters &
Bushnell attys.

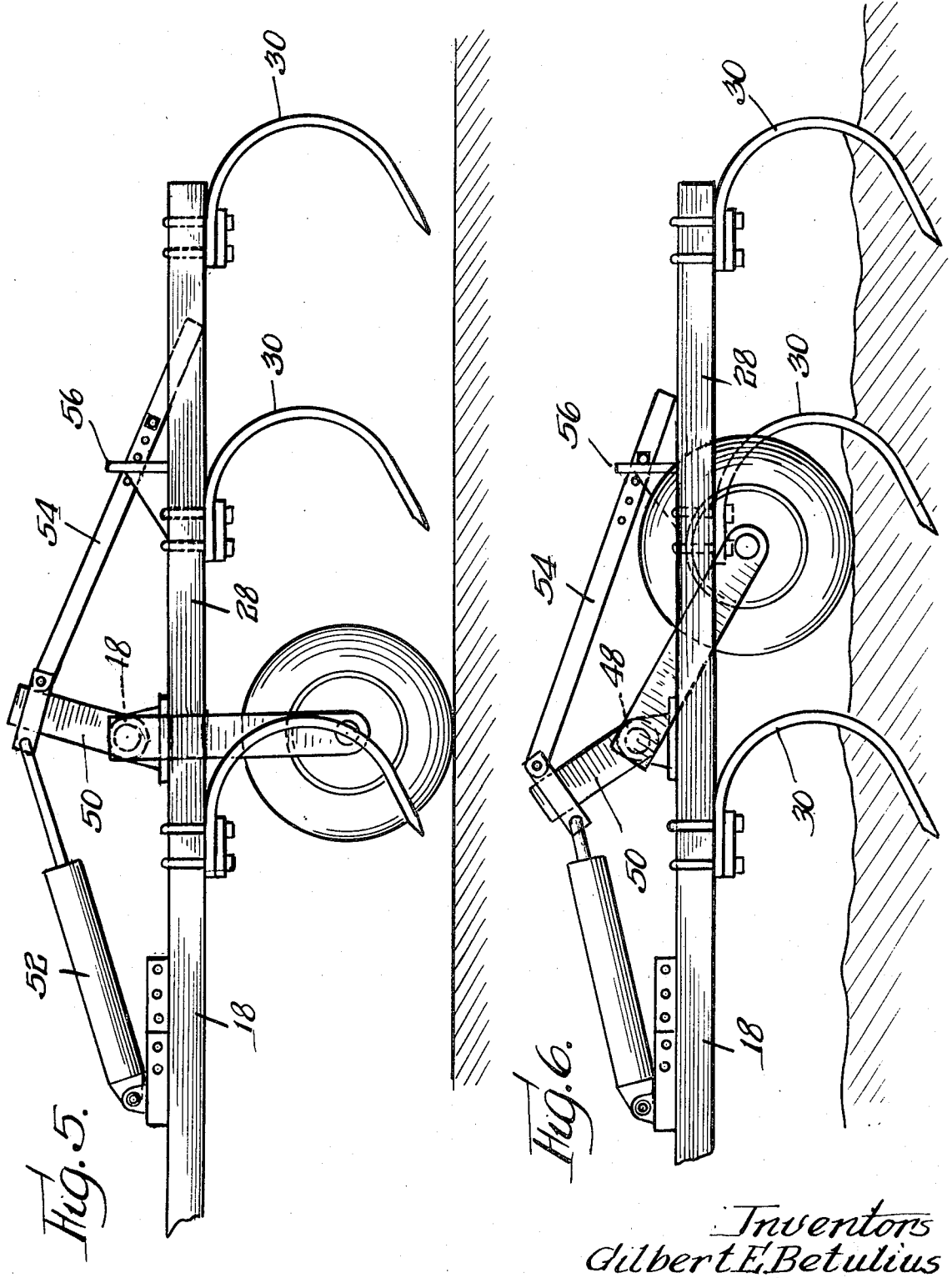

EARTHWORKING IMPLEMENT AND SUPPORT

BACKGROUND OF THE INVENTION

This invention relates to chisel plows and similar earthworking implements that contain a plurality of earthworking tools which are attached to a common frame. In the past, with earthworking tools which are attached to a single rigid frame, the frame has been supported by two wheels respectively located on opposing outside edges of the frame. This supporting arrangement, however, has several drawbacks, and the principal object of this invention is to provide an improved support structure that overcomes these drawbacks.

One drawback of the prior art supporting means relates to field bounce. Earthworking implements such as chisel plows are used on relatively rough fields where the bumps and furrows in the field cause a two wheel structure to bounce, which changes the orientation of the earthworking tools, and their depth of penetration, and thus produces uneven working of the earth. In addition, when the chisel plow is being transported from the barn to the field, or from field to field, it has to be drawn along a highway by a tractor. Since the tractor has to stay near the edge of the highway, the outside wheel of the chisel plow sometimes slips off the pavement and into the ditch. When this happens, the chisel plow point digs into the pavement and suffers extensive damage.

Furthermore, it is often desirable to attach a fertilizer tank directly to the frame of a chisel plow for fertilizing a field as it is plowed, and this, of course, adds extensive weight to the chisel plow. When a fertilizer tank is added to a plow which is supported by two wheels located at opposing side edges of its frame, the wheels tend to sink deeply into the soil, particularly if it is damp, which adds significantly to the drag of the plow and reduces the rate of plowing. Accordingly, it is the principal object of this invention to provide an improved supporting structure which eliminates these drawbacks.

SUMMARY OF THE INVENTION

In accordance with this invention, the above-noted objects are achieved by providing four or more wheel assemblies which are spaced across the frame of the earthworking implement so as to provide stable support for the frame when one or more of the wheels is disengaged from its supporting surface. The wheels are journaled to supporting struts that depend downwardly from a common cylindrical wheel support rod. The wheel support rod is journaled to the frame and means are provided for rotating the wheel support rod relative to the frame to raise and lower the frame. The spaced wheels significantly reduce field bounce and keep the chisel plow points from contacting the pavement even when a wheel runs into the ditch. In addition, the multiple wheel assemblies provide an increase in the area of the supporting surface for the frame and enables a fertilizer tank to be mounted directly on the plow without excessive sinkage of the wheels into the soil. Other more specific details and advantages of the invention will become apparent to those skilled in the art from the following description of one specific embodiment thereof as illustrated in the attached drawings.

DESCRIPTION OF THE DRAWINGS

FIG. 1 is a perspective view of one illustrative embodiment of the invention;

FIG. 2 is a front view taken along the plane 2—2 of FIG. 1.

FIG. 3 illustrates a prior art plow digging into a roadway surface when one of the outside wheels thereof has fallen into a ditch;

FIG. 4 shows how the multiple wheel supporting assembly of this invention provides stable support for the earthworking implement when one of the wheels thereof is out of contact with its supporting surface;

FIG. 5 is an elevation view of the embodiment shown in FIG. 1 with the frame thereof in its raised position; and FIG. 6 is an elevation view of the embodiment shown in FIG. 1 with the frame thereof in its lowered position.

DETAILED DESCRIPTION

Referring to FIG. 1, one illustrative embodiment of the invention contains an inner framework comprising structural members 10, 12, 14, and 16, which are preferably square wall tubing and are joined together by welding to provide a rigid inner framework. A drawbar 18 extends longitudinally through the center of the inner frame and is joined thereto by welding. Drawbar 18 is supported on its sides by diagonal supports 20 and 22 which are welded at one end to the corner of members 12 and 14 and at the other end to the front of drawbar 18. A hitch assembly 24 is attached to the front of the drawbar. Two outer C-shaped frame members 26 and 28 are attached by means of matching flanges which are bolted together onto the corners of the members 10 and 16 respectively. A plurality of chisel plow elements 30 are attached in staggered relationship to the various frame members and depend downwardly therefrom.

In this particular embodiment of the invention, the frame is supported by four wheel assemblies which are spaced transverse to the drawbar 18 so as to provide stable support for the frame when one or more of the wheels are disengaged from their supporting surface. This is particularly important in reducing field bounce when the plow is drawn across the field and also in preventing the plow points from digging into the pavement if one of the outside wheels should run into the ditch. As illustrated in FIG. 4, the spaced wheel assemblies of this invention provide stable support for the plow frame even if one of the wheels does run into the ditch.

The wheel assemblies comprise four wheels 32 through 38 which are journaled to the bottom end of corresponding downwardly depending struts 40 through 46. Struts 40 through 46 are rigidly attached to a cylindrical wheel support rod 48 which is journaled to the top of the frame member through journal housings which are mounted on the top of the longitudinal inner frame members 12 and 14 and the drawbar 18. Means are attached to the wheel support rod 48 for rotating the rod to raise and lower the frame with respect to the wheels as best shown in FIGS. 5 and 6.

Referring to FIGS. 5 and 6 an upwardly projecting lever arm 50 is rigidly attached to the center of wheel support rod 48 for rotating the rod through a limited arc. A hydraulic ram 52 is attached between the front end of lever arm 50 and drawbar 18 for rotating lever arm 50. A latching arm 54 is attached to the rear of lever arm 50 and slidably engages a slotted latch member 56. Latch member 56 has a plurality of bores spaced therealong, and the lever arm 50 can be latched in any desired angular position by inserting a pin through the appropriate one of the bores in latch arm 54 across the rear of latch member 56. This latching arrangement holds the wheel support rod 48 in the desired angular position without the necessity of maintaining the pressure on hydraulic ram 52.

Although this invention has been described in connection with one specific embodiment thereof, it will be understood by those skilled in the art that many modifications can be made in the disclosed structure without departing from the basic principles of this invention, and that this invention includes all modifications falling within the scope of the following claims.

We claim:

1. An earthworking implement comprising a rigid horizontal frame member, drawbar means attached to said frame member for applying a drawing force thereto, at least four wheel assemblies attached to said frame member at spaced locations along a line transverse to the axis of said drawbar means for supporting same frame member and permitting it to be drawn across the surface of a field, said wheel assemblies being substantially equally spaced to provide outside wheel assemblies and at least a pair of interior spaced wheel assemblies for stable support for said frame member when one or more of the wheel assemblies are disengaged from their supporting surface, a cylindrical wheel support rigid rod journaled to said frame member transverse to the axis of said drawbar means, said wheel assemblies each comprising a rigid strut fixedly attached at one end to said wheel support rod for rotation in unison with said rod and a wheel journaled to the other end of the strut, said struts being located adjacent a supported wheel assembly and thus similarly substantially equally spaced along said wheel support rod to provide stable support for said frame member when one or more of the wheel assemblies are disengaged from their supporting surface, a plurality of earthworking tools attached to said frame for engaging and working the surface of a field when said implement is drawn thereacross, means for rotating said wheel support rod about its own axis to raise and lower all of said wheels in unison with respect to said frame member, means for latching said wheel support rod in an angular position in which said wheels are lowered below the level of said earthworking tools for transporting the implement from one place to another without engaging the earthworking tools in the surface over which the implement is being transported, and means for disengaging said latch means to lower said earthworking tools below the level of said wheels for earthworking purposes.

2. An earthworking implement as defined in claim 1 wherein said means for rotating said wheel support rod about its own axis comprises at least one lever arm rigidly attached to said rod and projecting axially therefrom, and wherein said means for latching said rod in said angular position comprises means for latching said lever arm in a corresponding angular position with respect to said frame member.

3. An earthworking implement as defined in claim 2 wherein said wheel support rod is journaled to the top of said frame member, said struts projecting downwardly therefrom through corresponding openings in said frame member, and said lever arm projecting upwardly therefrom.

4. An earthworking implement as defined in claim 3 wherein said means for rotating said wheel support rod to raise and lower said frame with respect to said wheels comprises a hydraulic cylinder attached at one end to said frame and at the other end to said lever arm and means for actuating said hydraulic cylinder to apply a rotary force to said wheel support rod via said lever.

5. An earthworking implement as defined in claim 4 wherein said latch means comprises an elongated latch arm attached at one end to said lever arm and means mounted on said frame for slideable receiving said latch arm and latching it against movement, thereby securing said wheel support rod against rotation with respect to said frame.

6. An earthworking implement as defined in claim 5 wherein said latch arm has a plurality of bores therein for receiving a latch pin and further comprising a latch pin for insertion into said bores.

* * * * *